Nov. 21, 1961 J. L. CHRISTMANN 3,009,362

INTEGRATING MEANS

Filed Nov. 15, 1960 3 Sheets-Sheet 1

INVENTOR
J. L. CHRISTMANN
BY John A. Seifert
ATTORNEY

Nov. 21, 1961 J. L. CHRISTMANN 3,009,362

INTEGRATING MEANS

Filed Nov. 15, 1960 3 Sheets-Sheet 2

INVENTOR
J. L. CHRISTMANN
BY John A. Seifert
ATTORNEY

INVENTOR
J. L. CHRISTMANN

BY John A. Seifert
ATTORNEY

United States Patent Office 3,009,362
Patented Nov. 21, 1961

3,009,362

INTEGRATING MEANS

John L. Christmann, Passaic County, N.J., assignor to Merrick Scale Mfg. Company, Passaic, N.J., a corporation of New Jersey Filed Nov. 15, 1960, Ser. No. 69,451
11 Claims. (Cl. 74—198)

This invention relates to means for integrating the product of two variables, such as a load on a traveling conveyor.

Prior to this invention, the load on a traveling conveyor was integrated by a table rotated at a speed proportional to the rate of travel of the conveyor and a disk having its periphery contacting the face of the table and tilted by the load on the conveyor on an axis perpendicular to the table. In this type of integrating means, it is necessary to establish the balance position of the disk off the center of the table to lessen wear. In positioning the disk off table center, it is then necessary to use a non-reacting universal joint at the output side of the disk to avoid any reaction to the tilting movement of the disk. Said universal joint will further require a sliding connection to transmit the output rotation of the disk in the different radial positions of the disk on the table to a differential which is needed to reduce the rotation of the disk to zero at balance. If the disk was moved to the center of the table at balance, there would be no positioning force available to move the disk to or from the table center. It is then necessary to provide a second disk to obtain the necessary positioning force.

The present invention eliminates the disadvantages of the table and disk integrator by providing a ball freely and simultaneously rotatable on a fixed vertical axis representing the travel of the conveyor and on a fixed horizontal axis representing the load on the conveyor, and a disk movable over the circumference of the ball in an arc having its center on the horizontal axis of the ball whereby the maximum contact friction between the ball and the disk is used to actuate a small switch or similar device to transmit an impulse to a magnetic counter.

Another prior method of integrating the load on a traveling conveyor consists of a table rotated by the travel of the conveyor and a pair of balls radially adjusted on the table by the load on the conveyor with one ball contacting the table and the other ball contacting a drum connected to a counter whereby the rotation of the table is transmitted by the balls to the drum through three frictional contacts which will require a high contact pressure to reduce potential loss due to slippage.

The present invention overcomes the disadvantages of the ball and table integrator by providing a single frictional contact between a freely rotating ball having fixed horizontal and vertical axes and a rotating disk pivotally mounted to travel over the circumference of the ball in a plane transversely of the plane of rotation of the disk.

It is an object of the invention to provide means to integrate the load on a traveling conveyor wherein the maximum frictional torque created by the travel of a conveyor and the load on said conveyor is transmitted to a counter with a minimum number of elements.

Other objects and advantages of the invention will be set forth in the detailed description of the invention.

In the drawings accompanying and forming a part of this application.

Figures 2, 6, 7, 8:
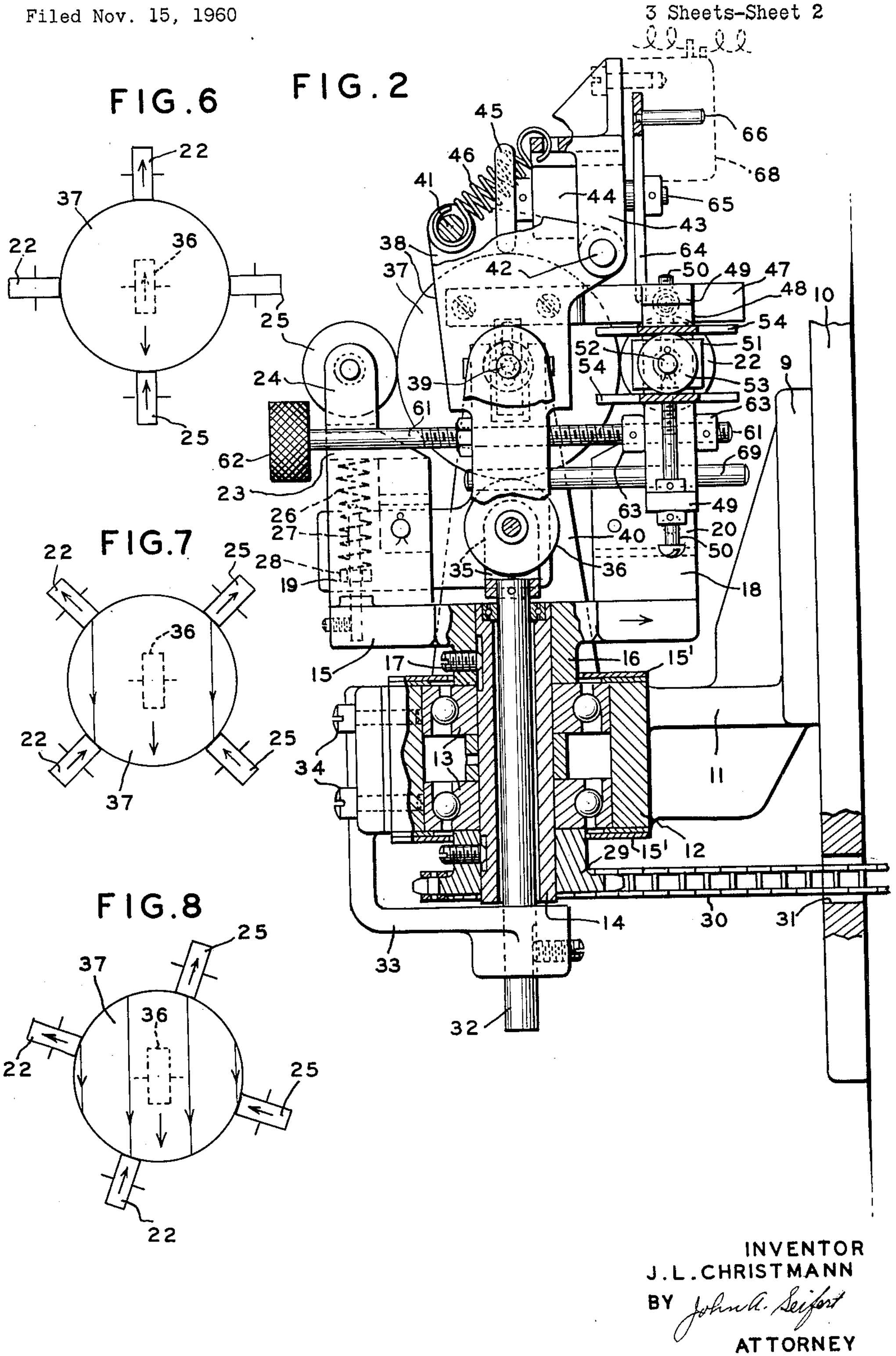
FIGURE 2 is a side sectional view taken on the irregular lines 2—2 of FIGURE 1 looking in the direction of the arrows.
FIGURES 5 to 8, inclusive, are diagrammatic views illustrating the operation of the invention.

The embodiment of the invention comprises a bracket 9 fixed to a panel 10 and having a lateral arm 11 arranged with a boss 12 adapted to support ball bearing 13 rotatably supporting a sleeve 14, as shown in FIGURE 2. The ball bearings 13 are retained in the boss 12 by collars 15′ secured to the boss.

A carrier in the form of a spider 15 is fixed to the sleeve 14 by a hub 16 integral with the carrier and secured by a set-screw 17 to an end portion of the sleeve 14 projecting above the boss 12. The carrier 15 is provided with four brackets 18 and 19 on diametrical opposite portions of the carrier. The brackets 18 support fixtures 20 having bifurcations 21 for rotatably supporting bearings in the form of rollers 22. The brackets 19 pivotally support rockers 23 having bifurcations 24 for rotatably supporting bearings in the form of rollers 25. The bearings 25 are yieldingly urged toward the center of the carrier 15 by springs 26 adjustably mounted on screw-threaded posts 27 secured in the carrier 15 by nuts 28 threaded on the posts 27, as shown in FIGURES 1 and 2.

The carrier 15 and the bearings 22 and 25 are rotated on the vertical axis of the sleeve 14 at a speed proportional to one of the variables to be integrated, namely in the present illustration of the invention the speed of travel of a conveyor, not shown. This is accomplished by securing a sprocket-wheel 29 on the end portion of the sleeve 14 extending below the boss 12 and a sprocket-chain 30 engaging the sprocket-wheel and extended through a slot 31 in the panel 10 to be operatively connected to and driven by the travel of the conveyor in any suitable manner which does not constitute a part of this invention.

Figure 1:
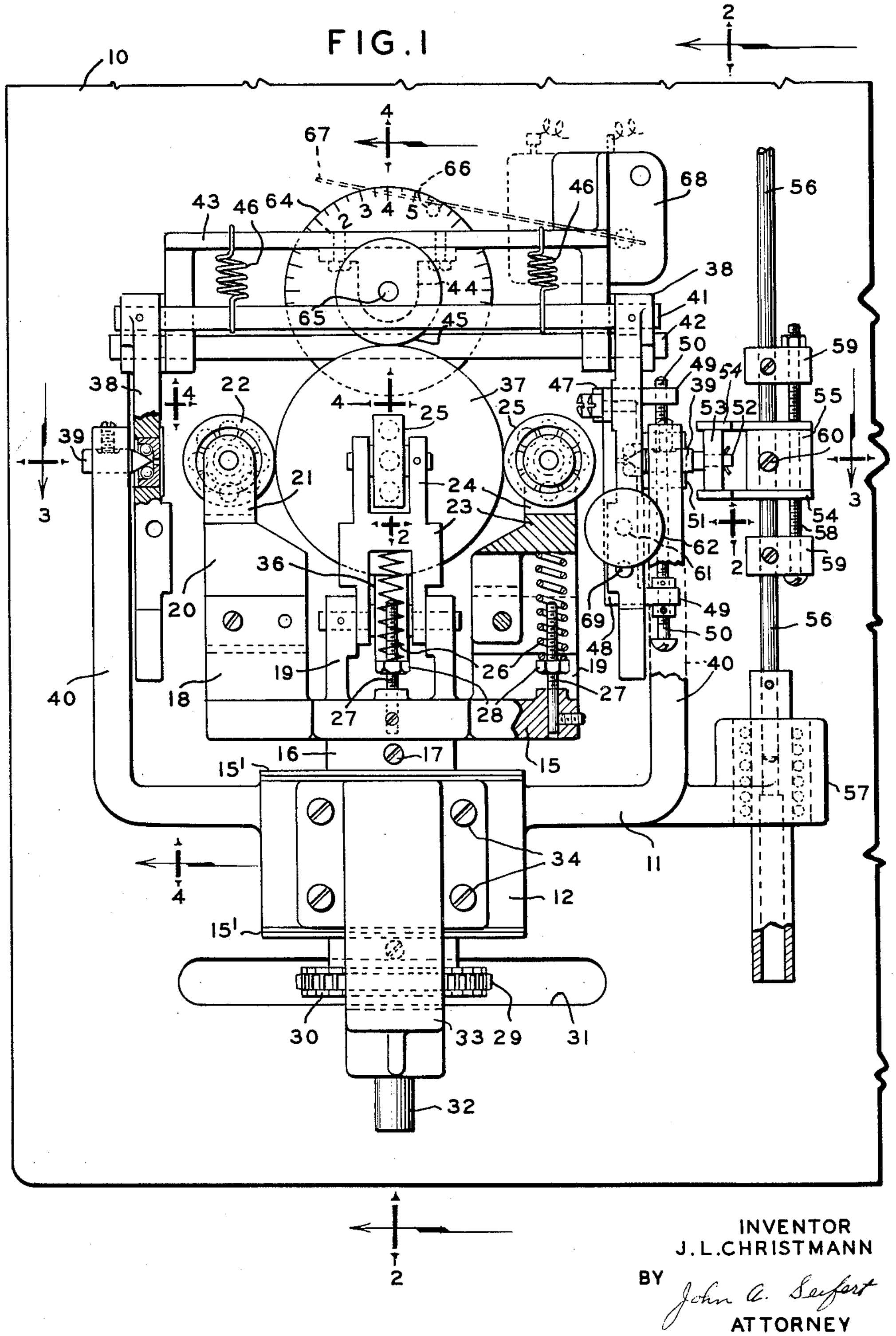
FIGURE 1 is a front elevational view of the integrating means constituting the present invention.

A shaft 32 is fixedly supported to extend through the sleeve 14 by a bracket arm 33 mounted on the bracket arm 11, as shown at 34 in FIGURES 1 and 2. One end portion of the shaft 32 is extended above the carrier 15 and is provided with a bifurcation 35 for rotatably supporting a bearing in the form of a roller 36.

A ball 37 is rotatably supported on its vertical axis by the bearing 36 with diametrical-horizontal portions of the ball 37 in contact with the bearings 22 and 25 whereby the ball 37 is rotated on its vertical axis by the rotation of the carrier 15 at a speed proportional to the speed of the conveyor. The bearings 22, 25 and 36 being rotatable on horizontal axis permit rotation of the ball 37 on its horizontal axis simultaneously with the rotation of the ball 37 on its vertical axis. FIGURES 6 to 8, inclusive, show that bearings 22, 25 and 36 permit this rotation of the ball 37 on its horizontal axis, as indicated by the arrows on the ball, regardless of the position of the bearings 22 and 25 relative to the bearing 36. The directions of rotation of the bearings 22, 25 and 36 are indicated by the arrows on said bearings. The vertical and horizontal axes of rotation of the ball 37 are fixed and do not change. The rockers 23 under the force of the springs 26 will maintain the bearings 22 and 25 in frictional contact with the ball 37.

Figures 3, 4, 5:
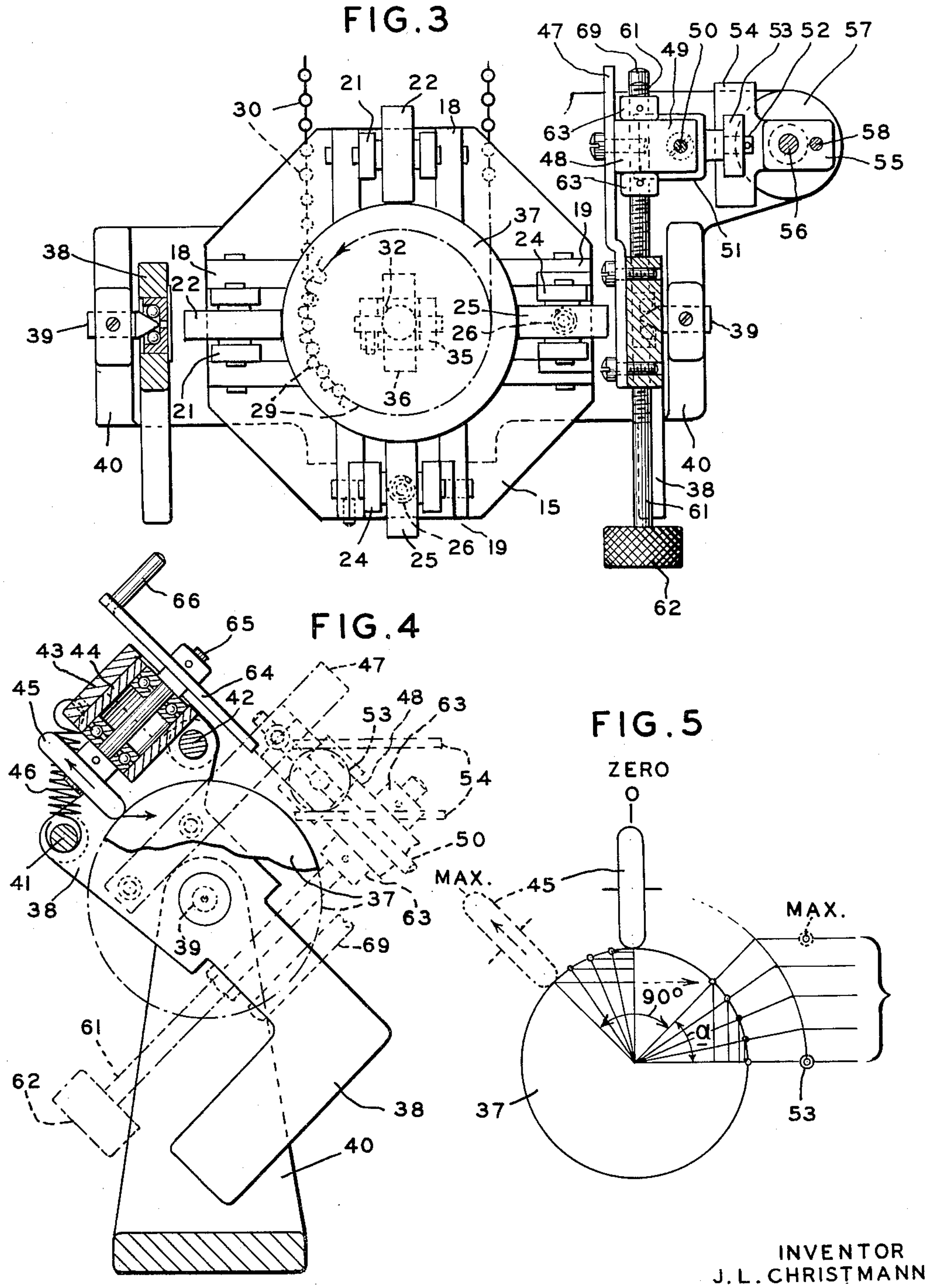
FIGURE 3 is a sectional plan view taken on the line 3—3 of FIGURE 1 looking in the direction of the arrows.
FIGURE 4 is a vertical-sectional view taken on the irregular lines 4—4 of FIGURE 1 looking in the direction of the arrows and showing the disk in its maximum position.

There is provided a carriage comprising two end plates 38 pivotally mounted on pivots 39 adjustable in arms 40 extended from the boss 12 on diametrically opposite sides of the carrier 15 and ball 37 with the pivots 39 in the plane of the horizontal axis of the ball 37, as shown in FIGURES 1 and 3. The plates 38 are connected to each other by rods 41 and 42. A frame 43 is pivotally mounted on the rod 42 and is arranged with a bearing 44 for rotatably mounting an integrator disk 45 frictionally contacting the circumference of the ball 37. The disk 45 is yieldingly urged into frictional contact with the ball 37 by springs 46 anchored at the opposite ends to the rod 41 and the frame 43. The carriage 38—42 is pivoted proportionally to the load on the conveyor by a lever system connected to a scale beam, not shown, and said lever system being partially shown as comprising an arm 47 fixed to and extended from one of the end plates 38 and slidable in a bracket 48 having lateral ears 49 for the adjustable mounting of a screw 50. A block 51 is mounted on the threads of the screw 50 in sliding engagement with the bracket 48 and is provided with a crank pin 52. A roller 53 is rotatably mounted on the crank pin 52 to engage a bifurcation 54 of a block 55 slidable on a linkage rod 56 guided in a boss 57 extended laterally from the bracket arm 11. The block 55 is adjusted longitudinally of the rod 56 by a screw 58 having the opposite end portions supported in blocks 59 secured on the rod 56. The block 55 is retained in adjusted position by a set-screw 60. The screw 58 is adjusted to correct the balance or zero position of the integrator disk 45. The integrator disk 45 is in zero position when the integrator disk is in vertical alignment with the axis of the bearing 36 and in the plane of the vertical axis of the ball 37, as shown in FIGURE 2. The roller 53 is adjusted radially to increase or decrease the movement of the arm 47 for calibration purposes, whereby the angular deflection of the disk 45 can be changed without changing the balance or zero position of said disk because the arm 47 is always horizontal at balance. This is accomplished by a calibrating screw 61 having a manipulating knob 62 at one end and adjustably mounted in the side plate 38 provided with the arm 47. The end portion of the screw 61 opposite the knob 62 is secured in the bracket 48 by collers 63 whereby the turning of the screw 61 in the side plate 38 will adjust the bracket 48 and thereby the roller 53 radially of the horizontal center of the ball 37. The bracket 48 is guided in its horizontal movement by the arm 47 and a rod 69 fixed at one end in the side plate 38 on which the arm 47 is mounted and the opposite end portion of the rod 69 is slidably engaged in the bracket 48.

The variations in the load on the conveyor will deflect the carriage 38—42 and the integrator disk 45 in an arc having its center at the horizontal axis of the ball 37. The maximum deflection of the integrator disk 45 on the ball 37 is 45° on one side of the vertical axis of the ball 37, as shown in FIGURE 5. As shown in FIGURE 5, the sin of angle *a* proportional to load deflection equals disk 45 deflection.

To indicate the load on the conveyor, a decimal wheel 64 is fixed on a shaft 65 on which the integrator disk 45 is fixed. The shaft 65 is rotatably mounted in the bearing 44. The decimal wheel 64 is provided with a pin 66 to engage a lever 67 of a switch 68 electrically connected to a magnetic counter, not shown.

Having thus described my invention, I claim:

1. Means for integrating a variable load traveling at a variable speed, comprising a single bearing rotatable on a fixed axis, a carrier rotatably mounted on an axis extending perpendicularly to the axis of the single bearing to rotate at a speed proportional to said variable speed, a plurality of bearings rotatably supported by the carrier, a ball supported by the single bearing in frictional contact with the plurality of bearings and rotated on its vertical axis by the rotation of the carrier, a carriage pivotally mounted on an axis extending parallelly of the fixed axis of the single bearing to pivot in proportion to the variable load, and a disk rotatably mounted and pivotally supported on the carriage in frictional contact with the ball, whereby the speed of rotation of the disk is proportional to the product of the variable load and variable speed.

2. Means for integrating a variable load traveling at a variable speed as claimed in claim 1, wherein the single bearing is positioned in the vertical axis of the ball in contact with the lowermost circumferential portion of the ball.

3. Means for integrating a variable load traveling at a variable speed as claimed in claim 1, wherein the plurality of bearings are in contact with diametrical opposite portions of the ball in the plane of the pivotal mounting of the cariage.

4. Means for integrating a variable load traveling at a variable speed as claimed in claim 1, wherein a predetermined number of the plurality of bearings are pivotally mounted on the carrier and yieldingly urged into contact with the ball to maintain contact of the plurality of bearings with the ball.

5. Means for integrating a variable load traveling at a variable speed as claimed in claim 1, wherein the plurality of bearings are rotatable on axes extending in the plane of the pivotal mounting of the carriage.

6. Means for integrating a variable load traveling at a variable speed as claimed in claim 1, wherein the disk is yieldingly urged into contact with the ball.

7. Means for integrating a variable load traveling at a variable speed as claimed in claim 1, wherein the single bearing and the plurality of bearings comprise rollers mounted on horizontal axes.

8. Means for integrating a variable load traveling at a variable speed as claimed in claim 1, wherein the axis of rotation of the disk is in the plane of the vertical axis of the ball.

9. Means of integrating a variable load traveling at a variable speed as claimed in claim 1, wherein the axes of rotation of the single bearing and of the disk extend ninety degrees to each other.

10. Means for integrating a variable load traveling at a variable speed as claimed in claim 1, wherein the single bearing and the disk contact diametrically opposite portions of the ball when the load is zero.

11. Means for integrating a variable load traveling at a variable speed as claimed in claim 1, a linkage rod slidably mounted in a vertical plane extending parallelly of the vertical axis of the ball, a member adjustably carried by the carriage and slidably connected to the linkage rod in the plane of the pivotal mounting of the carriage, whereby adjustment of said member varies the connection between said member and the linkage rod radially of the pivotal mounting of the carriage and change the position of the frictional contact of the disk on the ball.

References Cited in the file of this patent

UNITED STATES PATENTS

| | | |
|---|---|---|
| 2,412,468 | Newell | Dec. 10, 1946 |
| 2,528,284 | Newell | Oct. 31, 1950 |
| 2,540,809 | Brown | Feb. 6, 1951 |